(12) United States Patent
Hensley

(10) Patent No.: US 10,689,822 B2
(45) Date of Patent: Jun. 23, 2020

(54) SOIL CONDITIONING APPARATUS AND METHOD

(71) Applicant: Charles Hensley, Stanford, KY (US)

(72) Inventor: Charles Hensley, Stanford, KY (US)

( * ) Notice: Subject to any disclaimer, the term of this patent is extended or adjusted under 35 U.S.C. 154(b) by 0 days.

(21) Appl. No.: 16/733,674

(22) Filed: Jan. 3, 2020

(65) Prior Publication Data

US 2020/0141081 A1    May 7, 2020

Related U.S. Application Data

(63) Continuation-in-part of application No. 15/141,592, filed on Apr. 28, 2016, now Pat. No. 10,526,760.

(60) Provisional application No. 62/154,050, filed on Apr. 28, 2015.

(51) Int. Cl.
  *E02D 3/11* (2006.01)
  *A01B 33/16* (2006.01)
  *B09C 1/06* (2006.01)
  *A01M 21/04* (2006.01)

(52) U.S. Cl.
  CPC .............. *E02D 3/11* (2013.01); *B09C 1/065* (2013.01); *A01M 21/04* (2013.01); *B09C 2101/00* (2013.01)

(58) Field of Classification Search
  CPC .. B09C 1/00; B09C 1/06; B09C 1/065; B09C 2101/00; E02D 3/00; E02D 3/11; A01G 11/00; A01M 21/04
  See application file for complete search history.

(56) References Cited

U.S. PATENT DOCUMENTS

| | | | |
|---|---|---|---|
| 2,132,165 | A | 10/1938 | Henry |
| 2,858,755 | A | 11/1958 | Toulmin, Jr. |
| 3,745,700 | A | 7/1973 | Hahn |
| 4,420,901 | A | 12/1983 | Clarke |
| 4,974,528 | A | 12/1990 | Barcell |
| 5,111,756 | A | 5/1992 | Anderson |
| 5,199,212 | A | 4/1993 | Newcomb |
| 5,273,164 | A | 12/1993 | Lyon |
| 5,382,002 | A | 1/1995 | Evans et al. |
| 5,553,415 | A | 9/1996 | Harvey et al. |
| 6,655,082 | B1 | 12/2003 | Paltin et al. |

(Continued)

FOREIGN PATENT DOCUMENTS

GB          120587      11/1918
JP      2001-353205    12/2001

*Primary Examiner* — Frederick L Lagman
*Assistant Examiner* — Stacy N Lawson
(74) *Attorney, Agent, or Firm* — Brian W. Foxworthy; Robert R. Waters; Waters Law Group, PLLC

(57) ABSTRACT

A soil conditioner apparatus and method condition soil for compaction. The conditioner apparatus creates a heated stream of air directed toward the ground as the conditioner moves along the ground. A mixer on the conditioner mixes soil in the path of the heated air to dry the soil. Some embodiments of the mixer will propel the soil into the air in the stream of heated air. The conditioner can decrease moisture in the soil in the location where the soil will be compacted. In some embodiments, ambient air is introduced into the conditioning process by additional blowers. The mixer can also mix added soil and other additives to the soil in location. The conditioner apparatus may take the form of an apparatus towed by another vehicle, a set of towed apparatuses, an apparatus carried by another vehicle, or a self propelled vehicle having the operational elements of the soil conditioner.

14 Claims, 21 Drawing Sheets

(56) References Cited

U.S. PATENT DOCUMENTS

| | | |
|---|---|---|
| 7,712,999 B1 | 5/2010 | Huckabee |
| 2005/0084409 A1 | 4/2005 | Pivonka |
| 2008/0115410 A1 | 5/2008 | Fridman |

SOIL CONDITIONING APPARATUS AND METHOD

CROSS-REFERENCE TO RELATED APPLICATION

This application is a continuation-in-part application of U.S. patent application Ser. No. 15/141,592, filed Apr. 28, 2016. U.S. application Ser. No. 15/141,592, in turn, claims the priority benefit of U.S. Provisional Patent Application Ser. No. 62/154,050, filed Apr. 28, 2015. Both U.S. patent application Ser. No. 15/141,592 and U.S. Provisional Patent Application 62/154,050 are expressly incorporated by reference herein in their entirety.

FIELD OF THE INVENTION

The present invention is directed to a method and apparatus for quickly and effectively conditioning soil to make it workable for construction projects and other work projects. More specifically the present invention changes the moisture content of soil at a work site.

BACKGROUND OF THE INVENTION

Similar to buildings that require a stable foundation to support the building for the duration of the life of the building, construction projects that cover an area of ground require a stable foundation. Construction projects that fit into this class of projects include roads, airport runways, warehouses, and earth works such as levees, dams, and landscapes having steep grades. Other construction projects have this need as well. A subsidence of the earth beneath all of these types of projects causes immense damage and can be catastrophic to the point of risking lives, so the stable base is a must.

To establish this stable base at large area construction sites, the ground is compacted to form a layer of solid, stable, earth to support the structure over the life of the structure. This compaction may take multiple iterations where compacting equipment passes over an area to compact the soil. In some cases, soil in place is compacted and then additional soil is brought to the location and compacted on top of the original, compacted soil. For levees and dams that require a build-up of earth, the process necessarily requires high repetitions of the process of adding soil and compacting. In many cases, the added soil has specific characteristics for specific properties. Clay, for example, is frequently used as a constituent ingredient for its properties.

The soil compaction process is highly sensitive to the moisture content level in the soil. If the moisture content is too high, the compaction process does not work. This can essentially halt major construction projects until the issue is addressed which results in huge costs in time and money. There currently are methods for adjusting, i.e. removing, moisture from soil at construction sites. One method is removing earth from a location and spreading it for drying. Once the spread earth is sufficiently dry, it is moved back to the location and compacted. Another method is mixing in other components such as lime, etc. to reduce the moisture content. The different methods are not mutually exclusive. Once the moisture content of the soil is tested and meets the required low moisture content, the compaction process can begin.

SUMMARY OF THE INVENTION

Embodiments of the present invention provide an additional method for controlling the moisture content of soil at a construction site. Embodiments of the present invention create a flow of air and add heat to the air by burning fuel. At least some embodiments burn the fuel directly in contact with the flowing of air. The heated air is directed toward the ground and a soil mixer. The soil mixer churns the soil to expose the soil to the heated air. The soil is mixed to the depth reachable by the mixer and in some embodiments, the mixer will propel the soil up into the air into the stream of heated air which effectively exposes a greater surface area of the soil to the heated air. Some embodiments of the soil conditioner utilize a drying chamber to contain the mixing process. Some embodiments of the soil conditioner that have a drying chamber introduce ambient air directly into the drying chamber in addition to the heated air. This ambient air does not recirculate, but rather flows with the heated air to an exit. In some embodiments of the soil conditioner, the mixer is powered by the vehicle towing the soil conditioner. This can be accomplished by a power-take-off shaft on the towing vehicle. Other power requirements onboard the soil conditioner may be satisfied by an onboard generator for controls and for the blowers creating the flow of air.

Embodiments of the soil conditioner can condition the soil in the location where the soil is to be used and compacted. This removes the need for spreading the soil for drying. Multiple passes of the soil conditioner can be used when needed. The mixer of the soil conditioner can also facilitate the mixing of additives to the soil.

Before explaining at least one embodiment of the invention in detail, it is to be understood that the invention is not limited in its application to the details of construction and to the arrangement of the components set forth in the following description or illustrated in the figures. The invention is capable of other embodiments and of being practiced and carried out in various ways. Also, it is to be understood that the phraseology and terminology employed herein are for the purposes of description and should not be regarded as limiting.

Accordingly, those skilled in the art will appreciate that the conception upon which this invention is based may readily be utilized as the basis for other structures, methods, and systems for carrying out the purposes of the present invention. It is important, therefore, that the specification be regarded as including such equivalent constructions insofar as they do not depart from the spirit of the present invention.

Furthermore, the purpose of the foregoing abstract is to enable the U.S. Patent and Trademark Office and the public generally, and especially including the practitioners in the art who are not familiar with patent or legal terms or phraseology, to determine quickly from a cursory inspection, the nature and essence of the technical disclosure of the application. The Abstract is neither intended to define the invention of the application nor is it intended to be limiting to the scope of the invention in any way.

BRIEF DESCRIPTION OF THE DRAWINGS

Additional utility and features of this invention will become more fully apparent to those skilled in the art by reference to the following drawings.

DETAILED DESCRIPTION OF EMBODIMENTS

Figure 1:
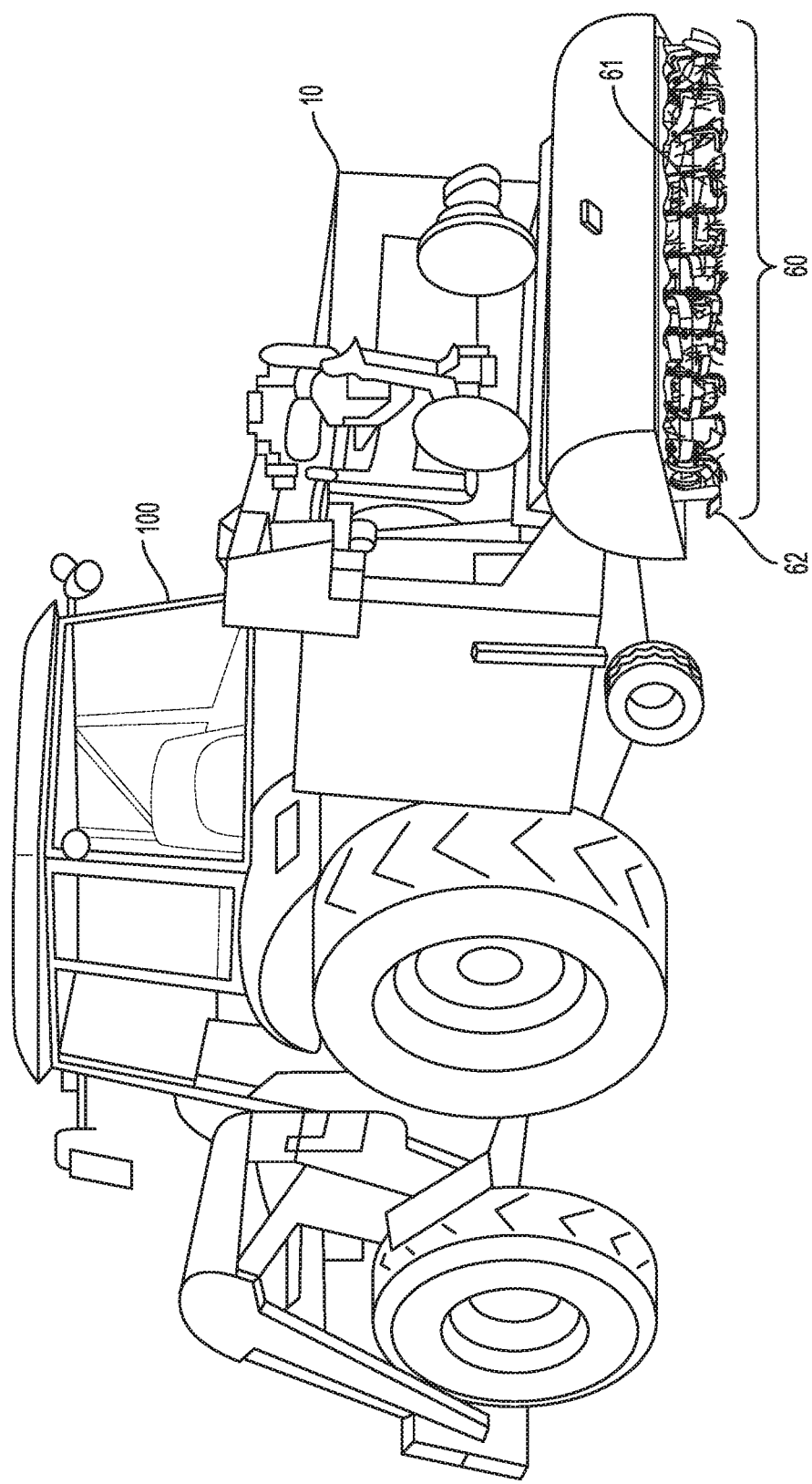
FIG. 1 shows an embodiment of the soil conditioning apparatus invention of the present application being towed by a vehicle.
Figure 2:
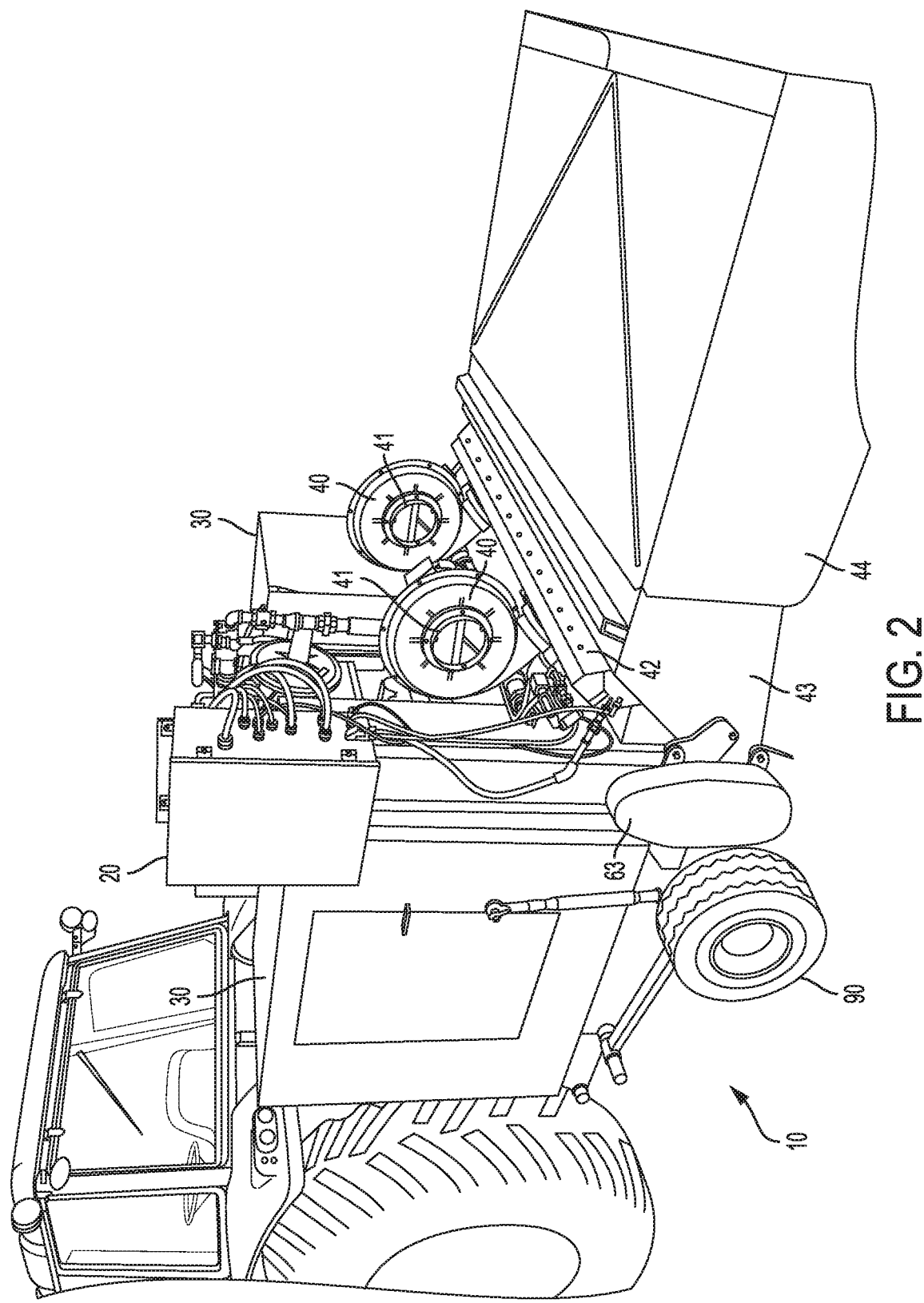
FIG. 2 is a left side perspective view of an embodiment of the soil conditioning apparatus invention of the present application.

FIG. 1 shows an embodiment of the soil conditioning apparatus 10 of the present application being towed by a vehicle 100. FIG. 2 is a left side perspective view of an embodiment of the soil conditioning apparatus 10 of the present application. Soil conditioning apparatus 10 heats air and directs it toward the ground while mixing soil in the path of the heated air. Control box 20 houses the centralized electrical controls for the apparatus. Some electrical controls are necessarily dispersed about the apparatus as well. Fuel housings 30 enclose fuel tanks or cells which contain the fuel burned to heat the air. Blowers 40 take in air at intakes 41 and move air into burner 42 which ducts toward the ground. Drying chamber 43 encloses the outlet of burner 42 and provides an initial drying space. Cowling 44 further contains heated air close to the ground. In this embodiment, wheel 90 supports soil conditioning apparatus 10 on the ground.

Figure 3:
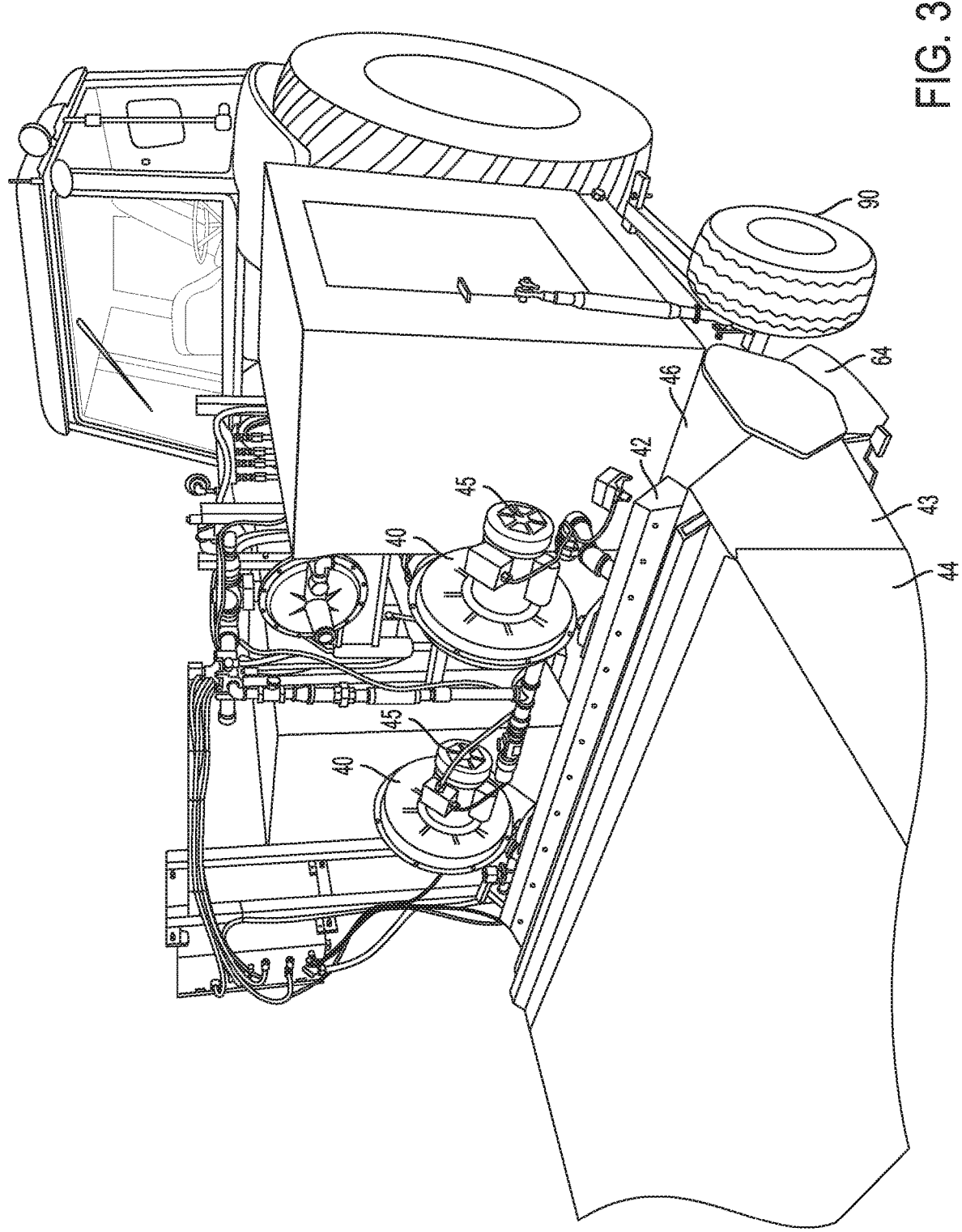
FIG. 3 is a right side perspective view of an embodiment of the soil conditioning apparatus invention of the present application.

FIG. 3 is a right side perspective view of an embodiment of the soil conditioning apparatus 10 of the present application. Motors 45 drive blowers 40. Mixer cover 46 encloses a soil mixer.

Figure 4:
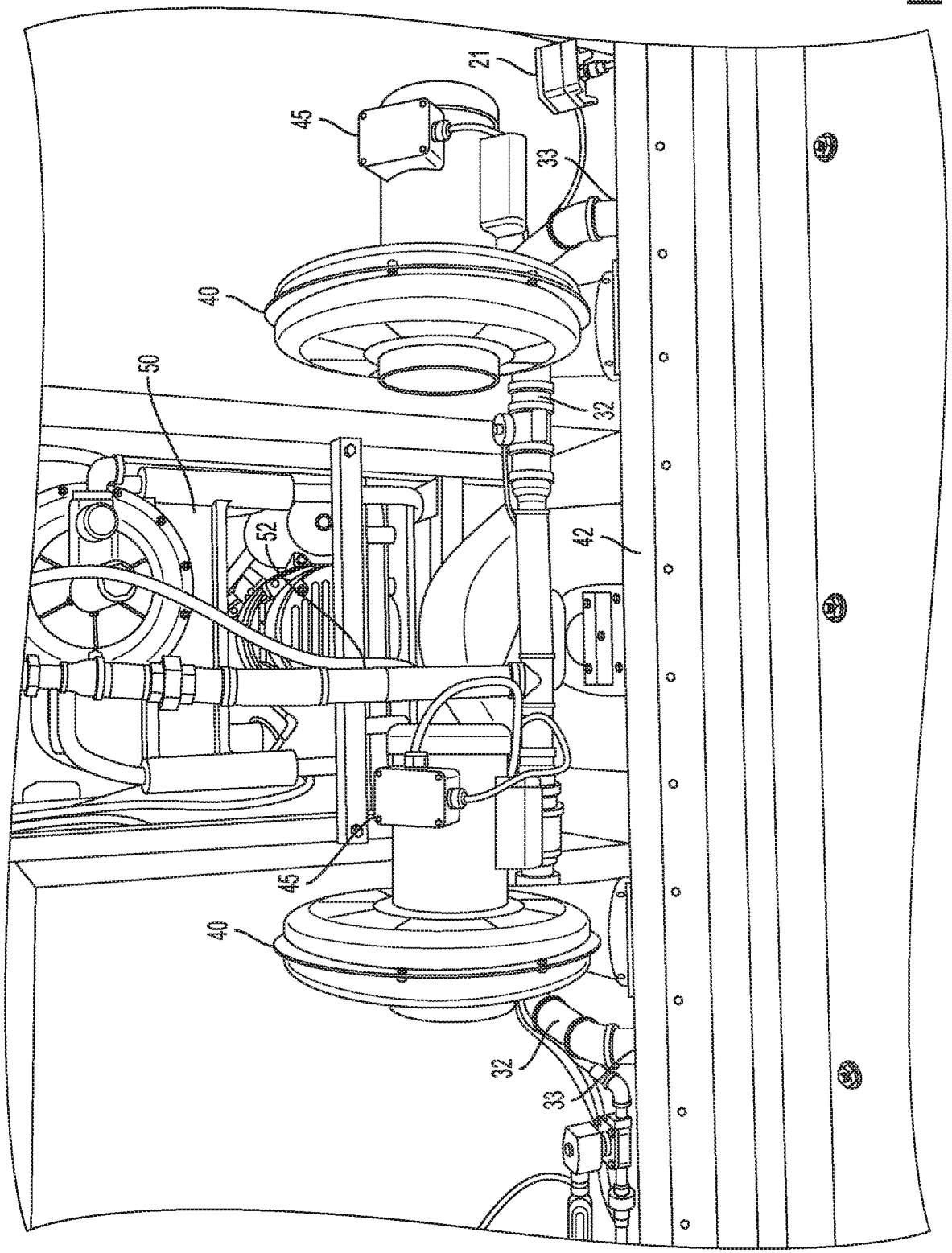
FIG. 4 is a rear detailed view of elements of an embodiment of the soil conditioning apparatus invention of the present application.

FIG. 4 is a rear detailed view of elements of an embodiment of soil conditioning apparatus 10 of the present application. Gas pipes 32 provide gas to burner 42 at gas inlets 33. Thermocouple 21 shuts off the gas to burner 42 if blowers 40 stop. The backside of generator 50 is visible in FIG. 4. Generator 50 provides the electrical power for motors 45 and the electrical controls of soil conditioner 10.

Figure 5:
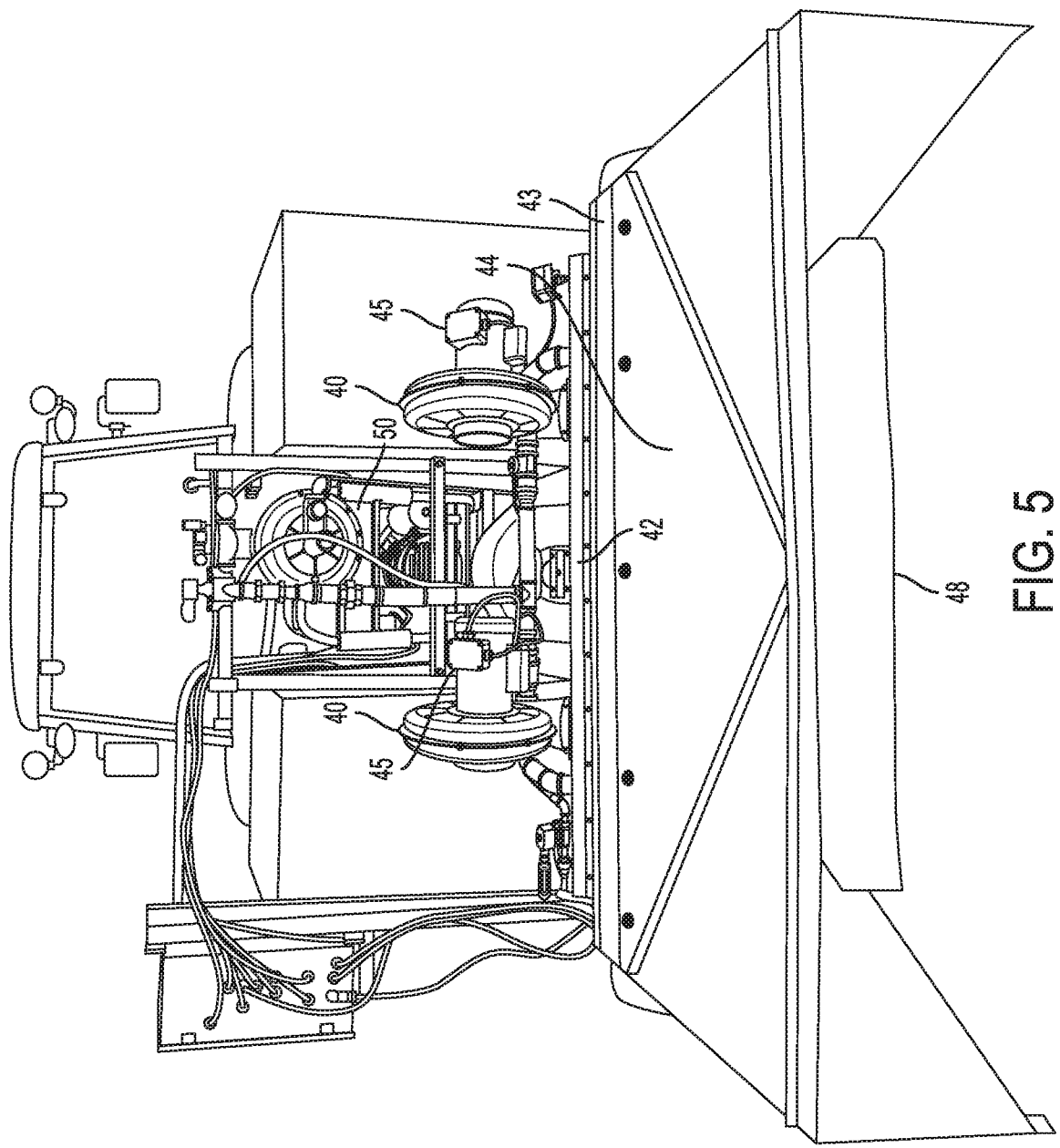
FIG. 5 is a rear perspective view of an embodiment of the soil conditioning apparatus invention of the present application.

FIG. 5 is a rear perspective view of an embodiment of the soil conditioning apparatus 10 of the present application. Exit 48 in cowling 44 directs the air to generally exit at the rear of apparatus 10. Cowling 44 further contains the activity of the mixer and drying chamber 43 and dampens the turbulent exit of air from drying chamber 43. Cowling 44 also provides a more extensive area for additional drying of the soil and a zone of further cooling of the heated air before final exit from soil conditioning apparatus 10.

Figure 6:
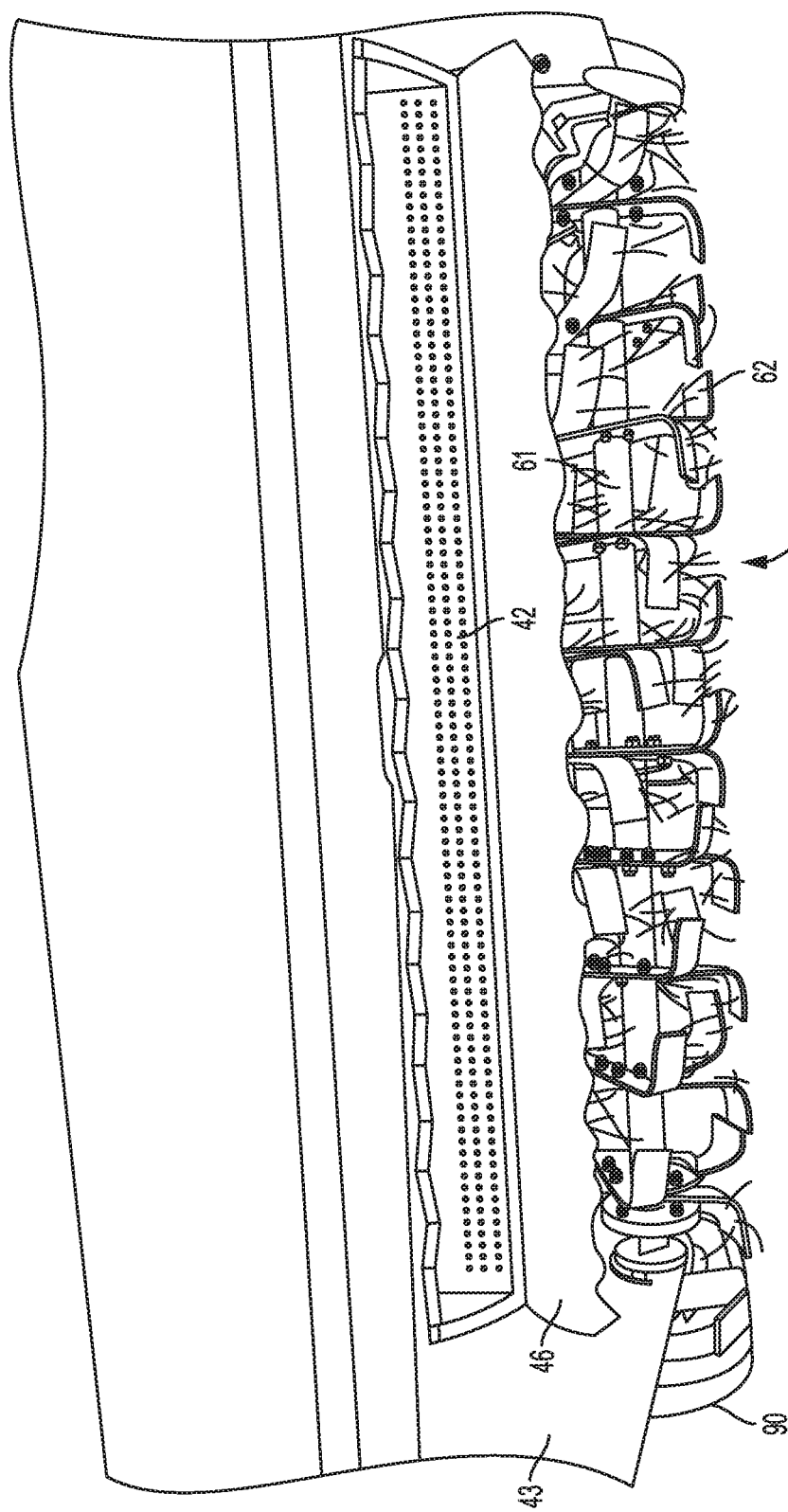
FIG. 6 is a lower rear view of an embodiment of the soil conditioning apparatus invention of the present application.

FIG. 6 is a lower rear view of an embodiment of soil conditioning apparatus 10. In this view, soil mixer 60 is visible. In the embodiment of FIG. 6 soil mixer 60 has a shaft 61 with a series of tines 62 extending from it. As mixer 60 rotates, tines 62 throw the soil into the air at the exit of burner 42 in drying chamber 43. If the soil is not already broken up, tines 62 can break up the soil to throw it in the air. As the soil is thrown up through drying chamber 43, a high proportion of moisture is removed from the soil. Returning to FIG. 2, mixer drive cover 63 encloses transmission elements which drive shaft 61 of mixer 60. Returning to FIG. 3, bearing cap 64 marks the opposite end of shaft 61 of mixer 60. In some embodiments of soil conditioner 10, mixer 60 is driven by a power-take-off shaft (PTO) of the vehicle towing soil conditioner 10.

Figure 7:
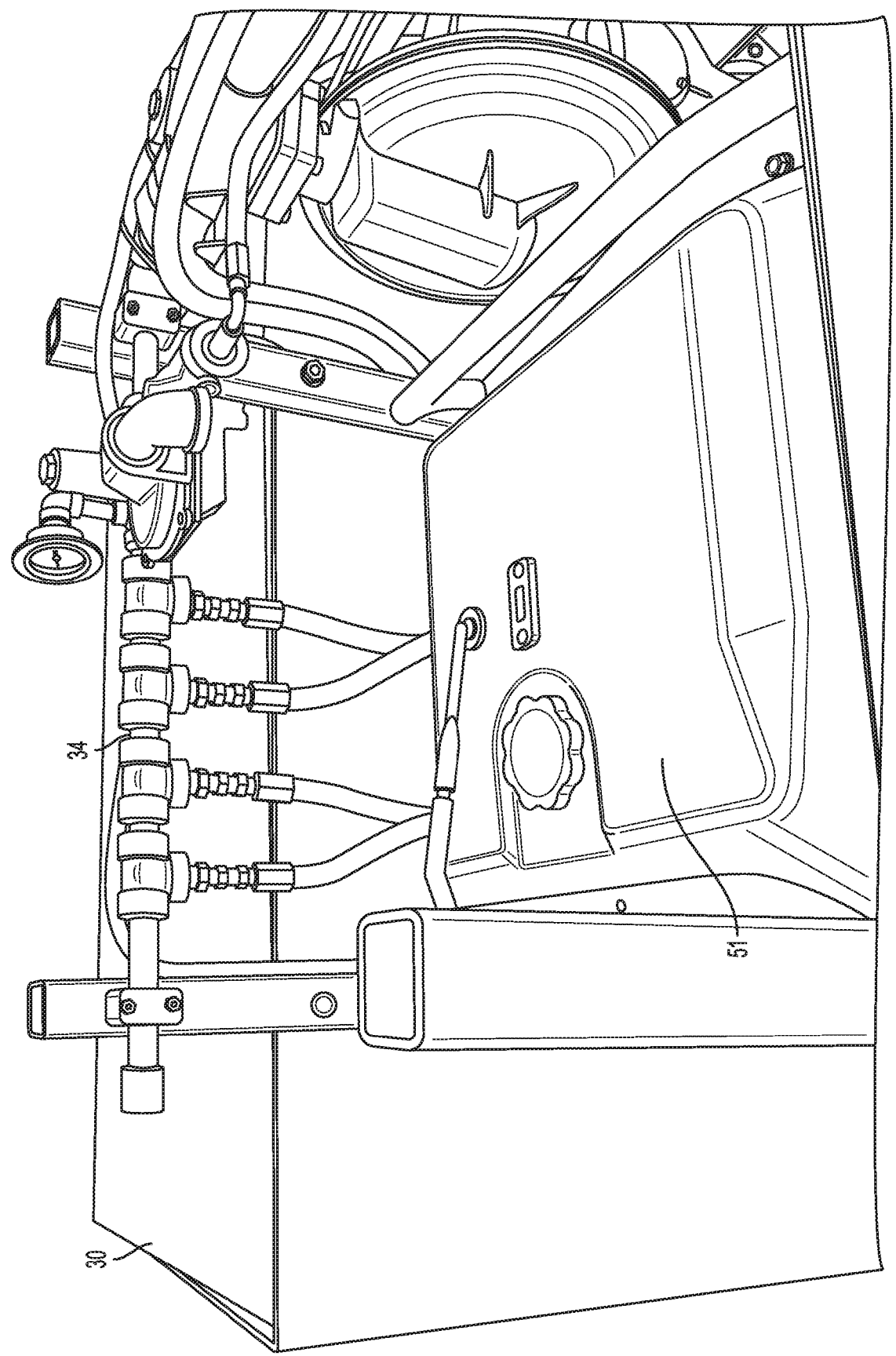
FIG. 7 is an upper perspective view of elements of an embodiment of the soil conditioning apparatus invention of the present application.
Figure 8:
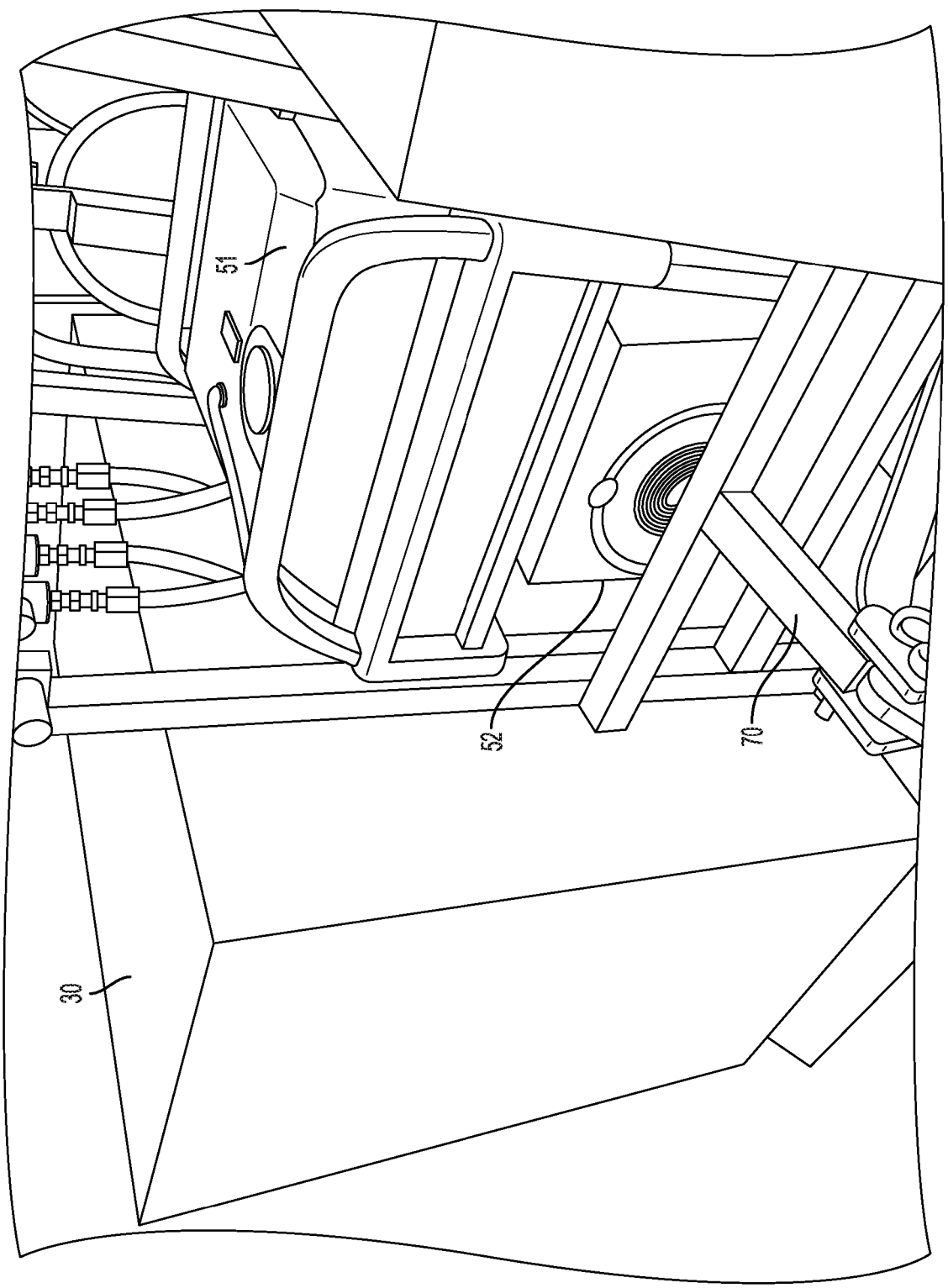
FIG. 8 is a front perspective view of elements of an embodiment of the soil conditioning apparatus invention of the present application.
Figure 9:
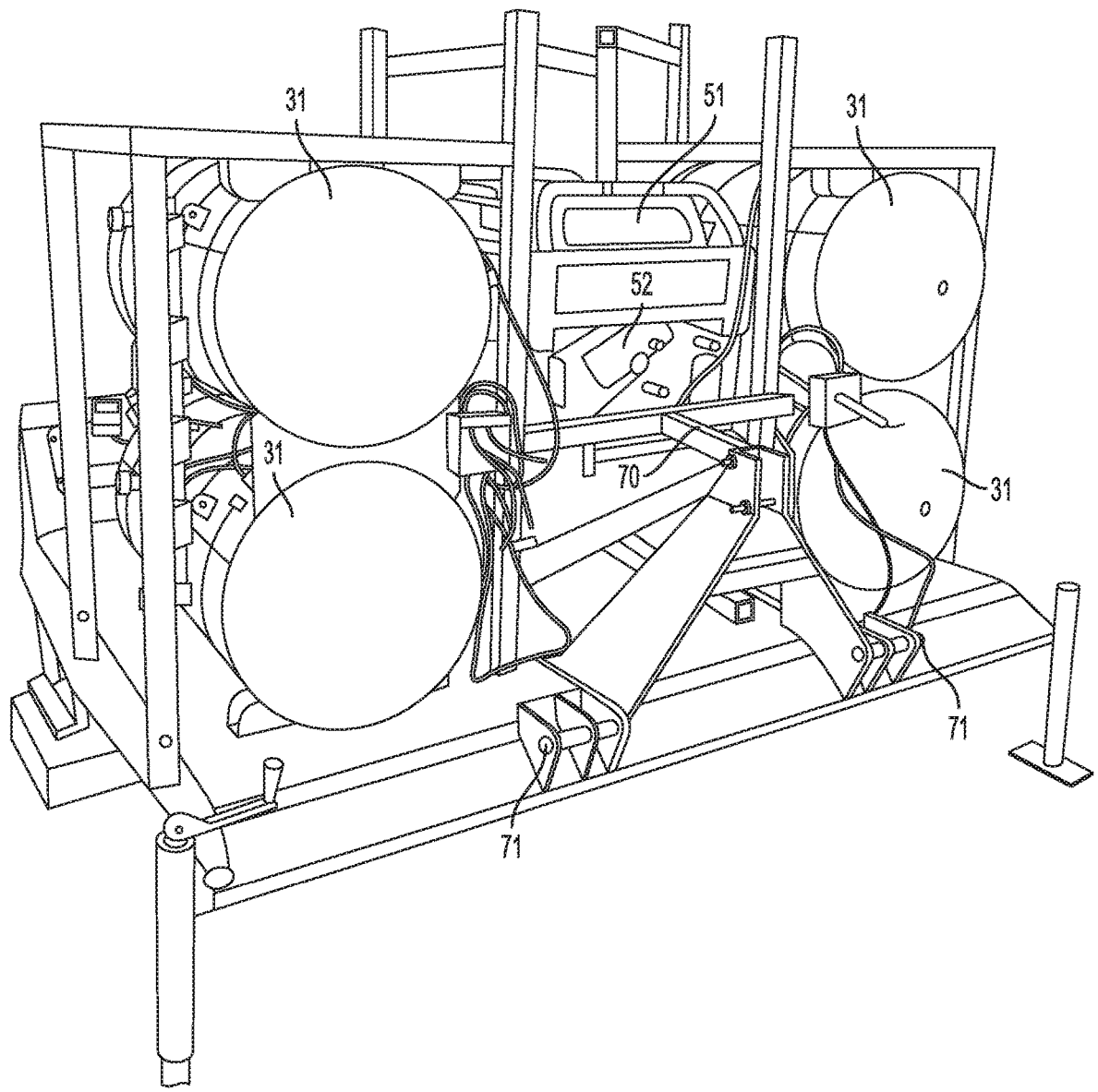
FIG. 9 is a front perspective view of an embodiment of the conditioning apparatus invention of the present application with covers removed.

FIG. 7 is an upper perspective view of elements of an embodiment of soil conditioning apparatus 10. Fuel reservoir 51 contains fuel to power generator 50. Manifold 34 receives gas lines from several gas tanks and combines them into a single source for burner 42. FIG. 8 is a front perspective view of elements of an embodiment of soil conditioning apparatus 10. Internal combustion engine 52 of generator 50 turns the armature of generator 50 to generate the power for motors 45 and other electrical elements of soil conditioner 10. Upper arm 70 provides the top connection point for a three point hitch of a towing, or carrying, vehicle. FIG. 9 is a front perspective view of an embodiment of soil conditioning apparatus 10 of the present application with covers of fuel housings 30 removed. Fuel tanks 31 hold the fuel for burner 42. Lower pivots 71 provide the lower connecting points for a three point hitch of a vehicle carrying or towing soil conditioner 10.

Figure 10:
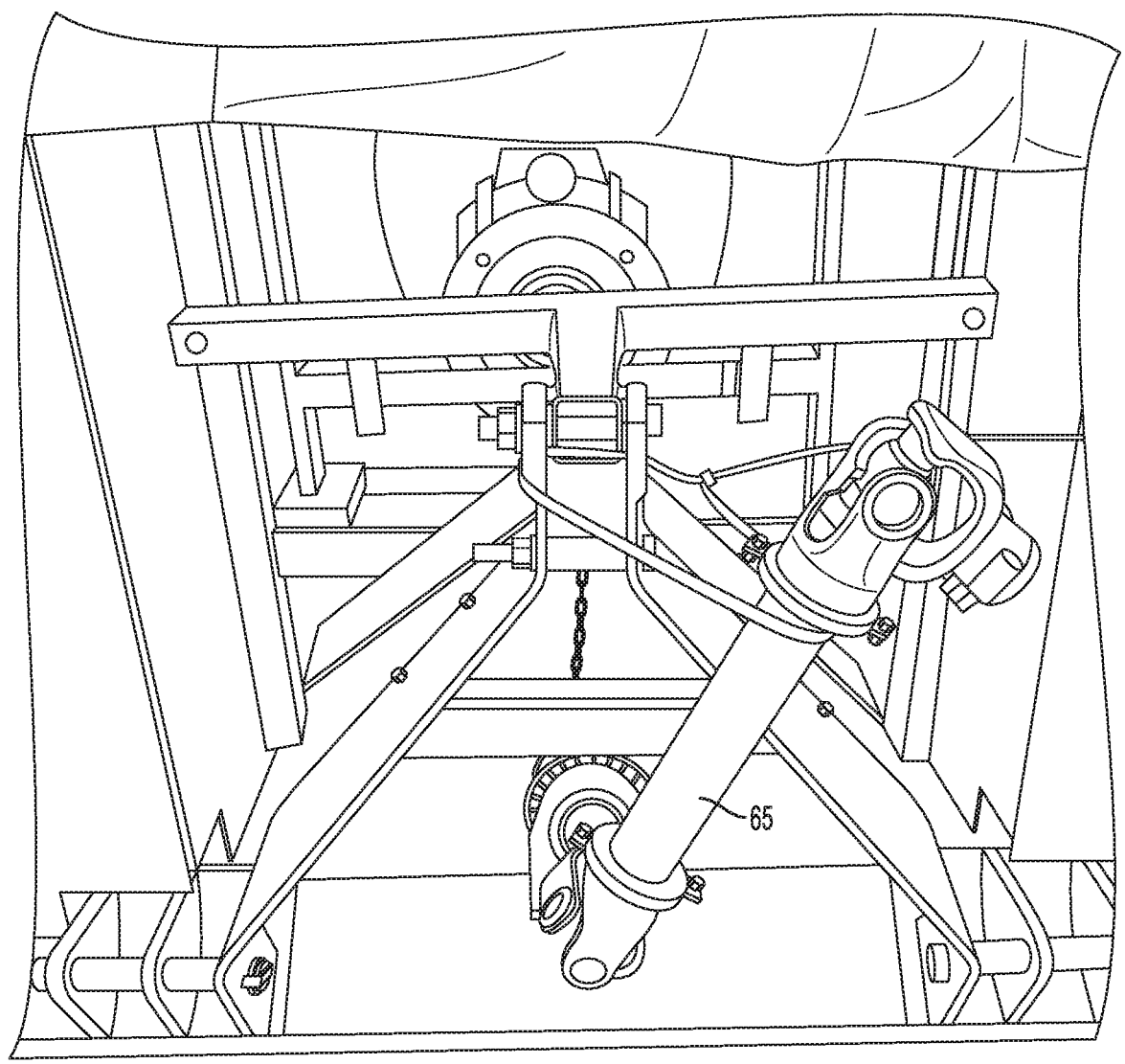
FIG. 10 is a front perspective view of an embodiment of the conditioning apparatus invention of the present application showing a power-take-off connector.
Figure 11:
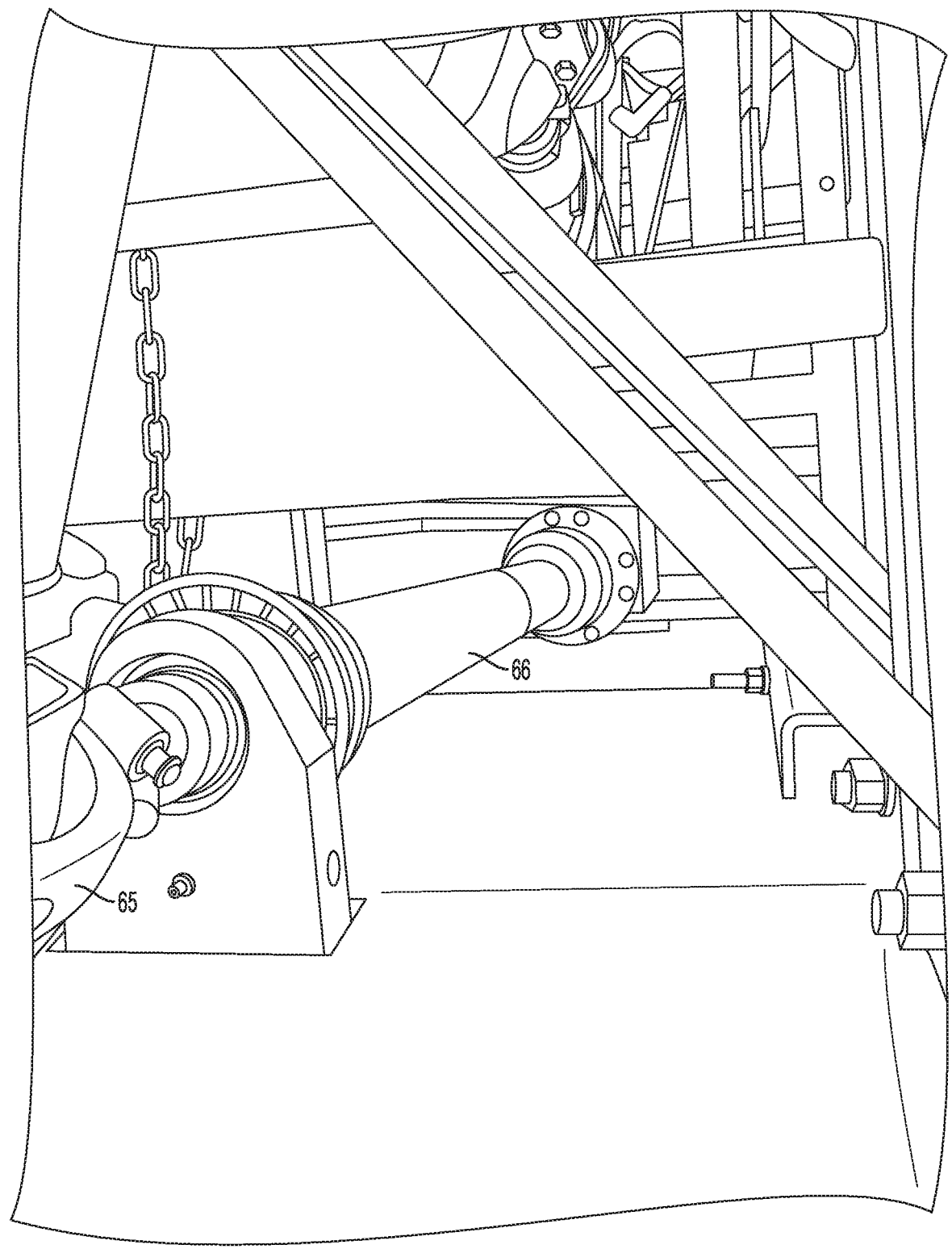
FIG. 11 is a front perspective view of an embodiment of the conditioning apparatus invention of the present application showing a drive shaft driven by a power-take-off connector.

FIG. 10 is a front perspective view of an embodiment of the conditioning apparatus 10 of the present application showing power-take-off connector 65. FIG. 11 is a front perspective view of an embodiment of the conditioning apparatus invention of the present application showing drive shaft 66 driven by power-take-off connector 65. In some embodiments of soil conditioner 10, soil mixer 60 is driven by a PTO shaft on a towing or carrying vehicle. The PTO shaft drives power-take-off connector 65 which turns drive shaft 66. This powers the whole drive train for mixer 60.

Figure 12:
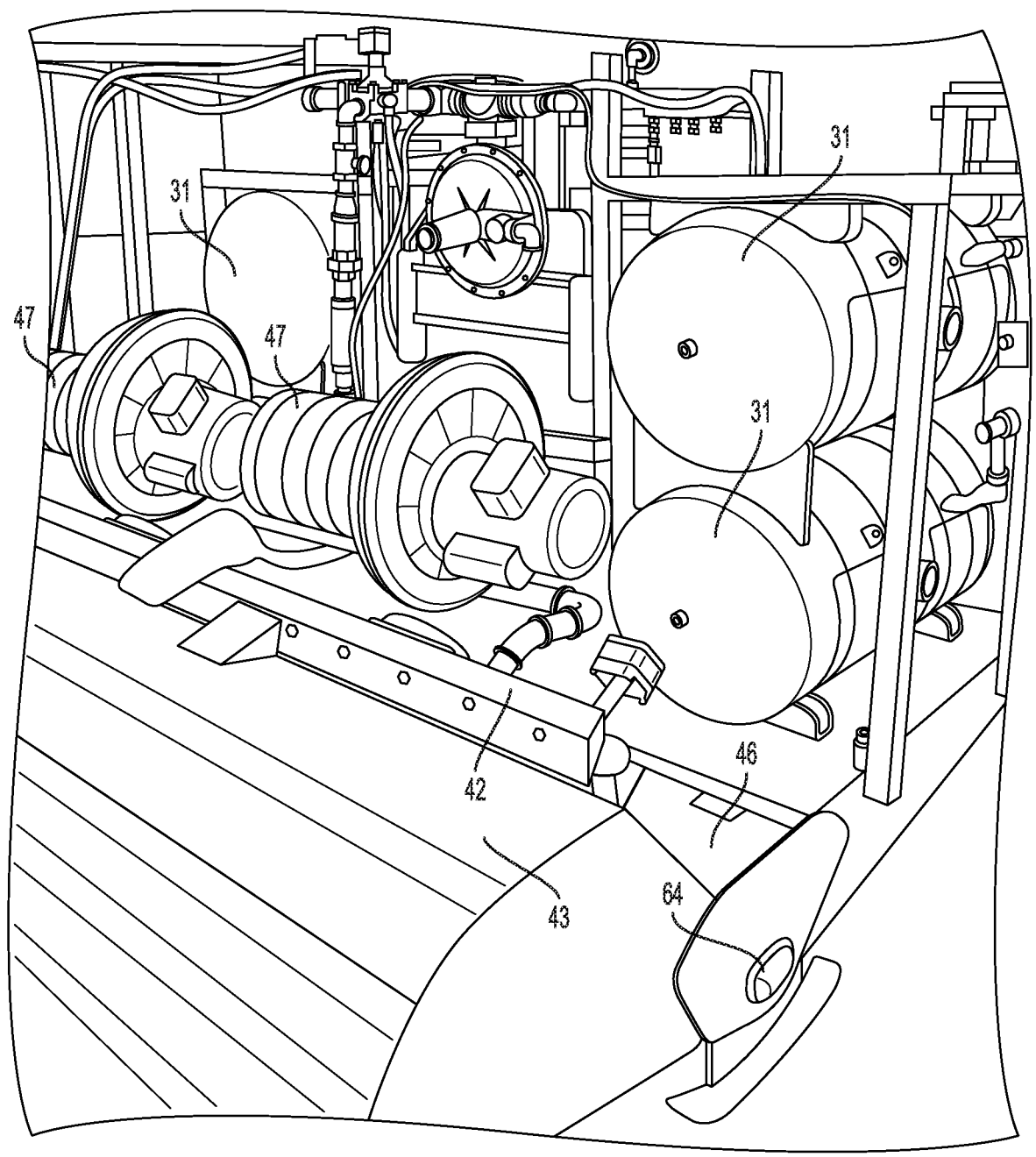
FIG. 12 is a rear perspective view of an embodiment of the soil conditioning apparatus invention of the present application.

FIG. 12 is a rear perspective view of an embodiment of soil conditioning apparatus 10 of the present application. In FIG. 12, filters 47 are mounted on blowers 40. Drying chamber 43 is uncovered, showing the downward curvature of the top wall of drying chamber 43 in the embodiment of FIG. 12.

Figure 13:
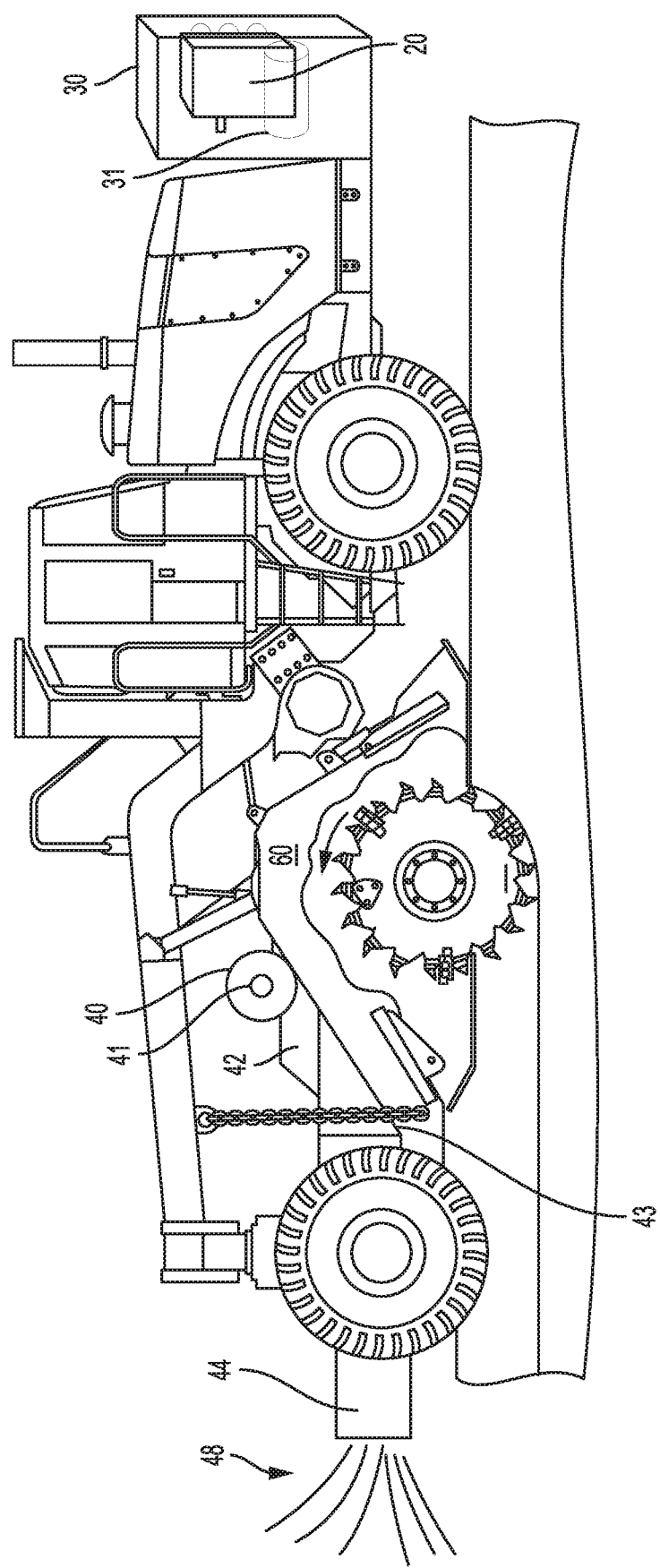
FIG. 13 is a side view of an embodiment of the soil conditioning apparatus invention of the present application.
Figure 14:
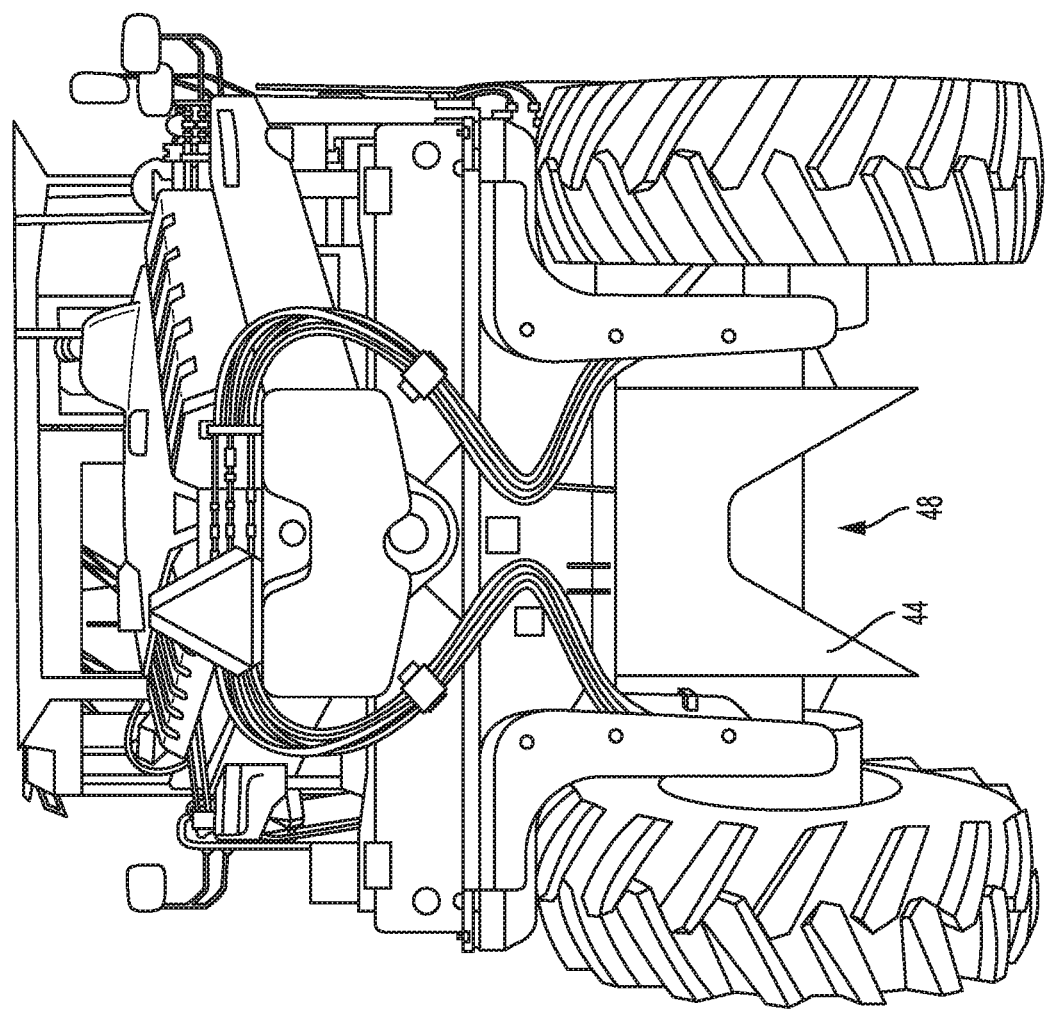
FIG. 14 is a rear view of an embodiment of the soil conditioning apparatus invention of the present application.
Figure 15:
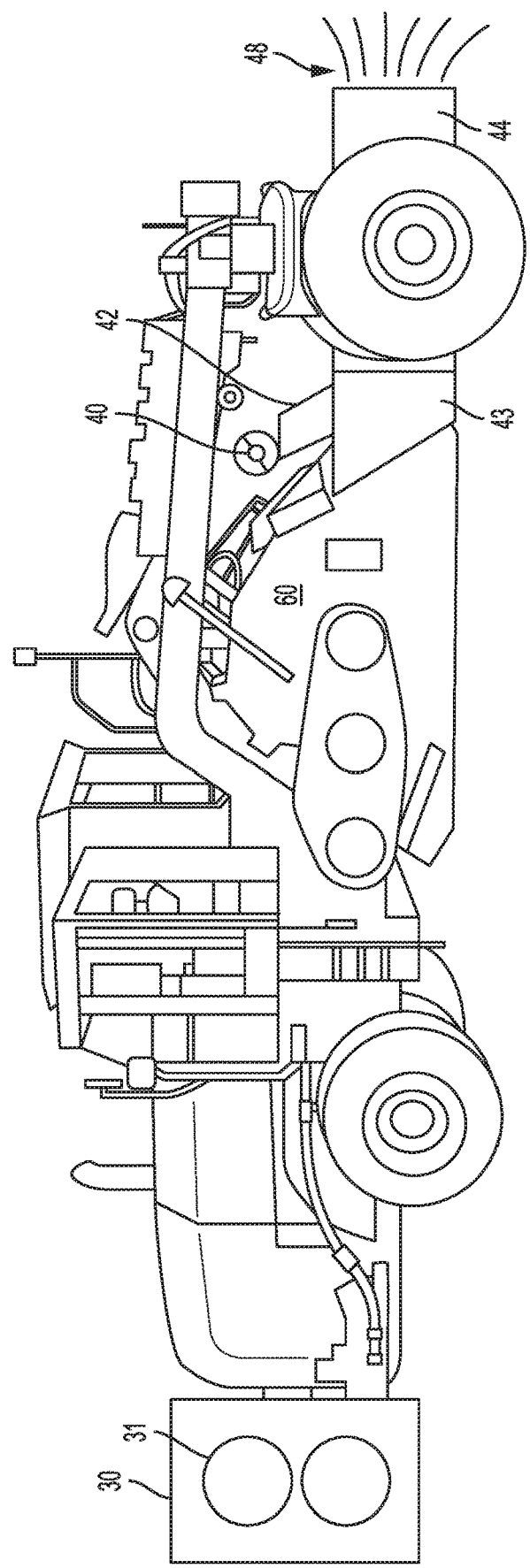
FIG. 15 is a side view of an embodiment of the soil conditioning apparatus invention of the present application.

FIG. 13 is a side perspective view of an embodiment of the soil conditioning apparatus 10 of the present application. Cowling 44 further contains heated air close to the ground and extends between the rear wheels of a self-propelled vehicle. In this embodiment, a mobile ground soil conditioning apparatus with a structural frame is carried by a self-propelled vehicle. FIG. 14 is a rear perspective view of a mobile ground soil conditioning apparatus with a structural frame, carried by a self-propelled vehicle with Cowling 44 extending between the rear wheels of a self-propelled vehicle. Exit 48 depicts where hot air is exhausted from soil conditioning apparatus 10. FIG. 15 is another side perspective view of an embodiment of the soil conditioning apparatus 10 of the present application.

In operation, the embodiments of soil conditioner 10 of the figures is pulled along an area of ground that needs to be conditioned for work. Fuel and air are induced into burner 42 and the fuel is combusted to heat the air which passes into drying chamber 43. Soil mixer 60 mixes the soil beneath drying chamber 43 as soil conditioner 10 moves along the ground which results in reduced moisture in the soil, rendering the soil into a more workable state. This exposes soil as deep beneath the surface as mixer 60 is capable of reaching. In some embodiments, mixer 60 propels soil up into the air within drying chamber 43. When the soil is propelled into the air, greater surface area of pieces of soil are exposed to the heated air.

Embodiments of soil conditioner 10 have multiple adjustable parameters to optimize the process. Rate of travel over the ground being conditioned can be adjusted. The rate of air flow into burner 42 and drying chamber 43 can be adjusted by varying the speed of motors 45. The heat added to the air can be adjusted by the amount fuel introduced into burner 42. The rate of mixing of the soil can be varied by adjusting the rate of turn of mixer 60. In some embodiments of soil conditioner 10 the rate of mixer 60 is controlled by varying the rate of turn of the PTO of a towing vehicle.

Figure 16:
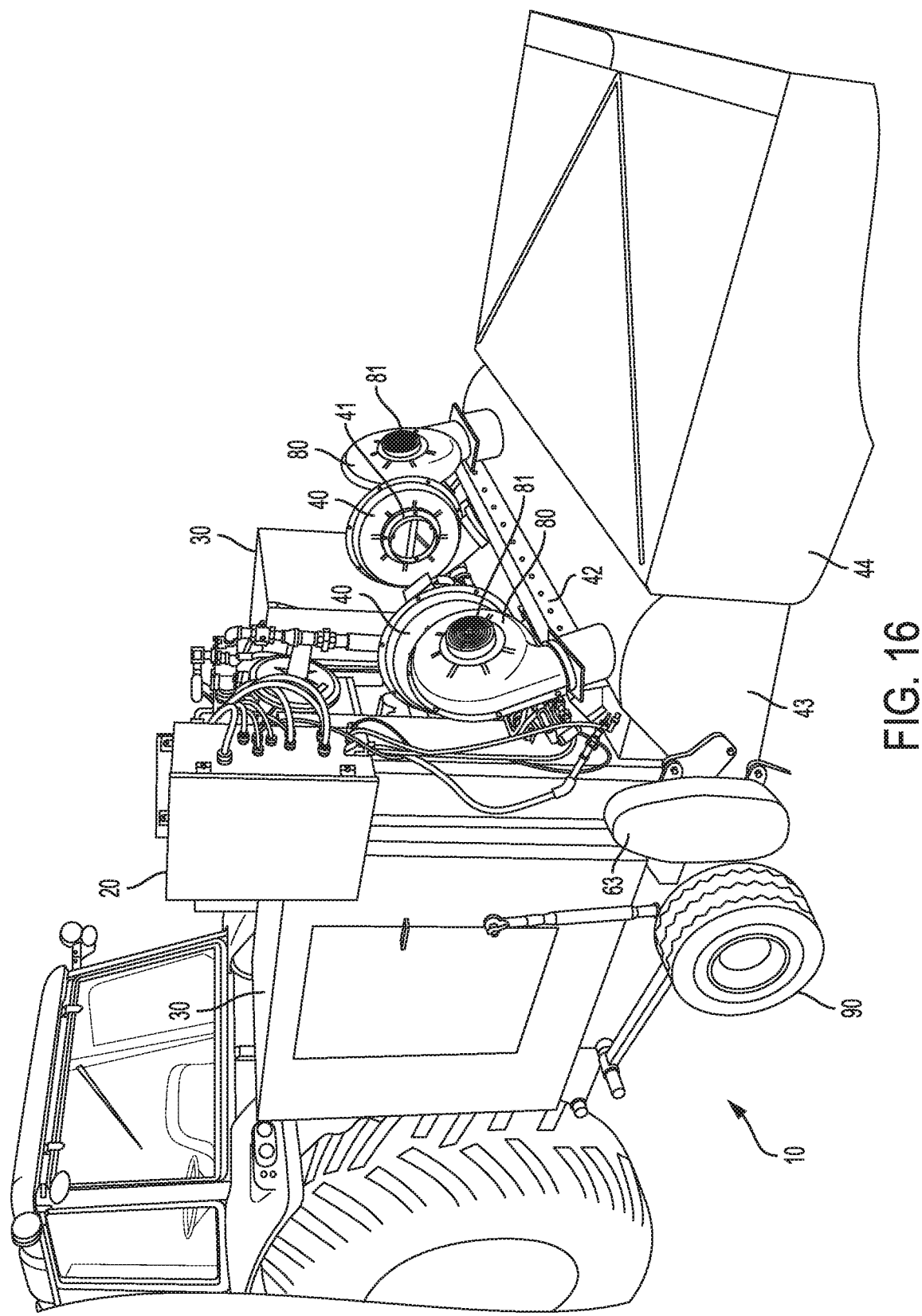
FIG. 16 is a left side perspective view of an embodiment of the soil conditioning apparatus invention of the present application having blowers directing ambient air into the drying chamber.

FIG. 16 is a left side perspective view of an embodiment of the soil conditioning apparatus 10 of the present application. Soil conditioning apparatus 10 heats air and directs it toward the ground while mixing soil in the path of the heated air. Control box 20 houses the centralized electrical controls for the apparatus. Some electrical controls are necessarily dispersed about the apparatus as well. Fuel housings 30 enclose fuel tanks or cells which contain the fuel burned to heat the air. Blowers 40 take in air at intakes 41 and move air into burner 42 which ducts toward the mixer within drying chamber 43 and the ground. Drying chamber 43 encloses the outlet of burner 42 and provides an initial drying space. In the embodiment of FIG. 16, soil conditioning apparatus also has ambient blowers 80. Ambient blowers 80 take in ambient air at intakes 81 and introduce ambient air into drying chamber 43. This introduction of ambient air provides additional control over the process of conditioning the soil. For example, in some situations, the heated air generated by burners 42 may cause sufficient moisture to be released from the soil that a "muddy" consistency is reached. Ambient blowers 80 introduce unheated ambient air into drying chamber 43 to more thoroughly evaporate, or drive off, the released moisture. In embodiments having ambient blowers 80, cowling 44 further contains the mix of air close to the ground. The ambient air does not recirculate, but rather, flows with the heated air to an exit. In this embodiment, wheel 90 supports soil conditioning apparatus 10 on the ground.

Figure 17:
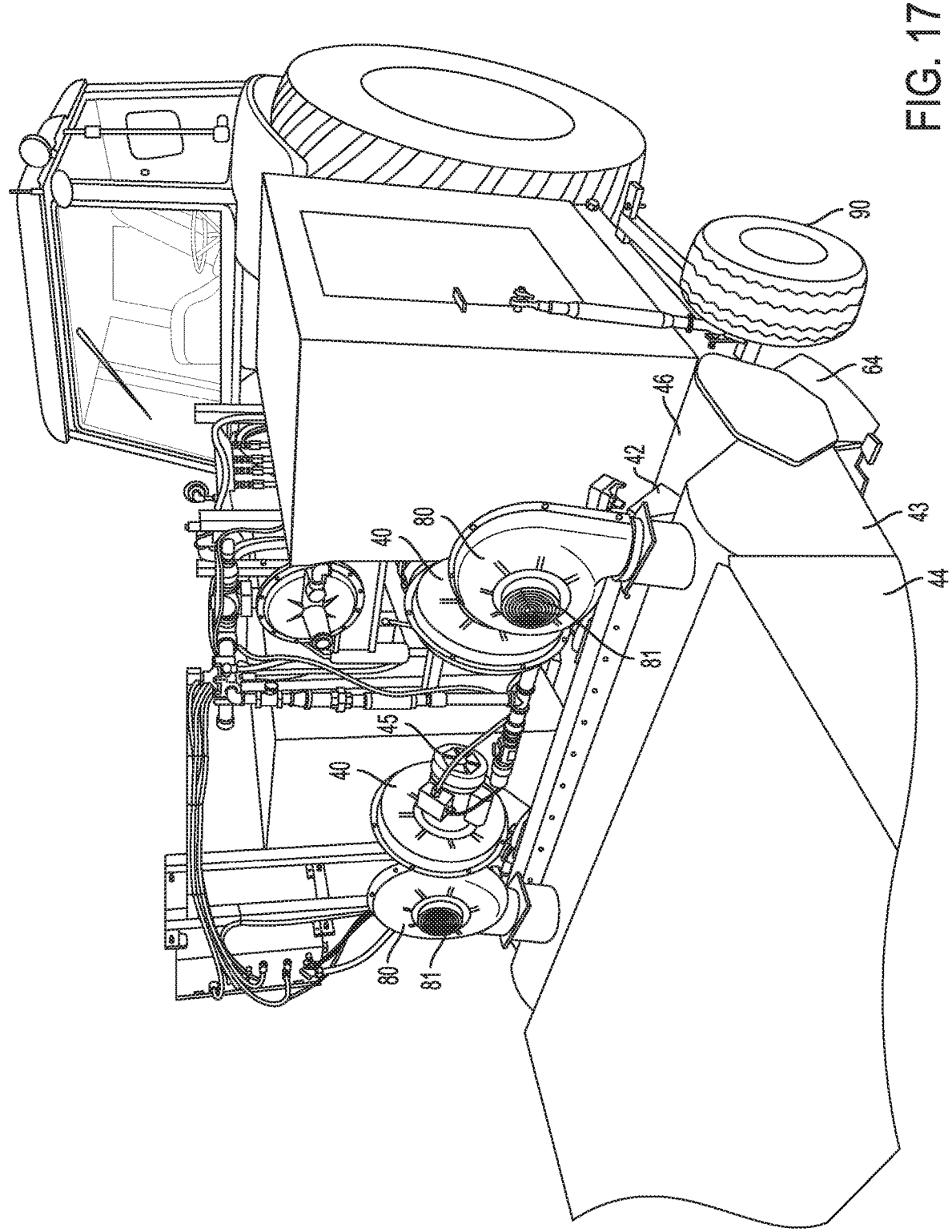
FIG. 17 is a right side perspective view of an embodiment of the soil conditioning apparatus invention of the present application having blowers directing ambient air into the drying chamber.

FIG. 17 is a right side perspective view of an embodiment of the soil conditioning apparatus 10 of the present application. Motors 45 drive blowers 40. Mixer cover 46 encloses a soil mixer. The embodiment of FIG. 17 also employs ambient blowers 80 introducing ambient air into drying chamber 43. Ambient blowers 80 may be powered by the same sources as blowers 40 and controlled similar to blowers 18.

Figure 18:
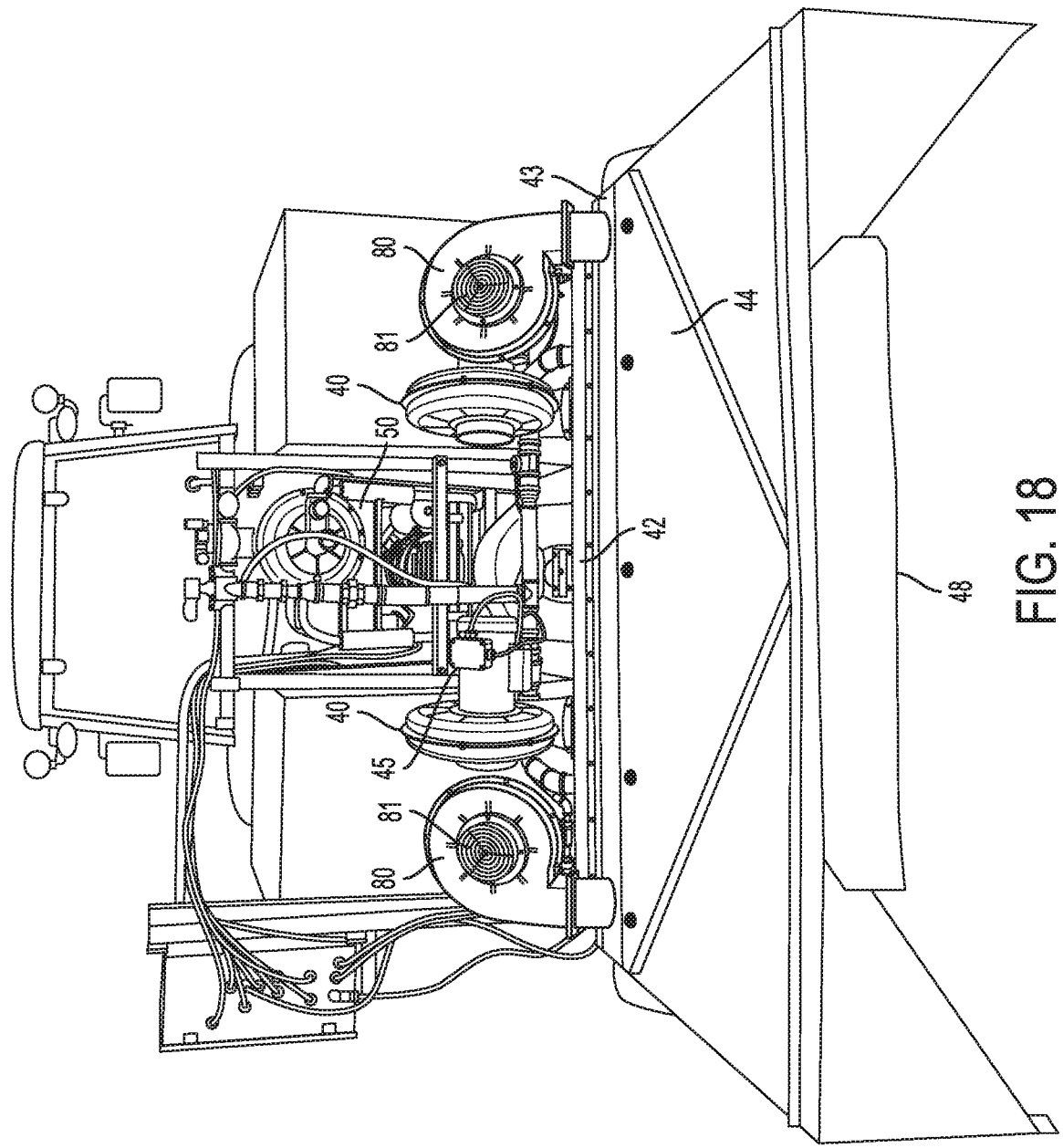
FIG. 18 is a rear perspective view of an embodiment of the soil conditioning apparatus invention of the present application having blowers directing ambient air into the drying chamber.

FIG. 5 is a rear perspective view of an embodiment of the soil conditioning apparatus 10 of the present application. In the embodiment of FIG. 18, ambient blowers 80 are spaced wider than blowers 40. Exit 48 in cowling 44 directs the mixture of heated air and ambient air to generally exit at the rear of apparatus 10. Cowling 44 further contains the activity of the mixer and drying chamber 43 and dampens the turbulent exit of air from drying chamber 43. Cowling 44 also provides a more extensive area for additional drying of the soil and a zone of further cooling of the heated air before final exit from soil conditioning apparatus 10.

Figure 19:
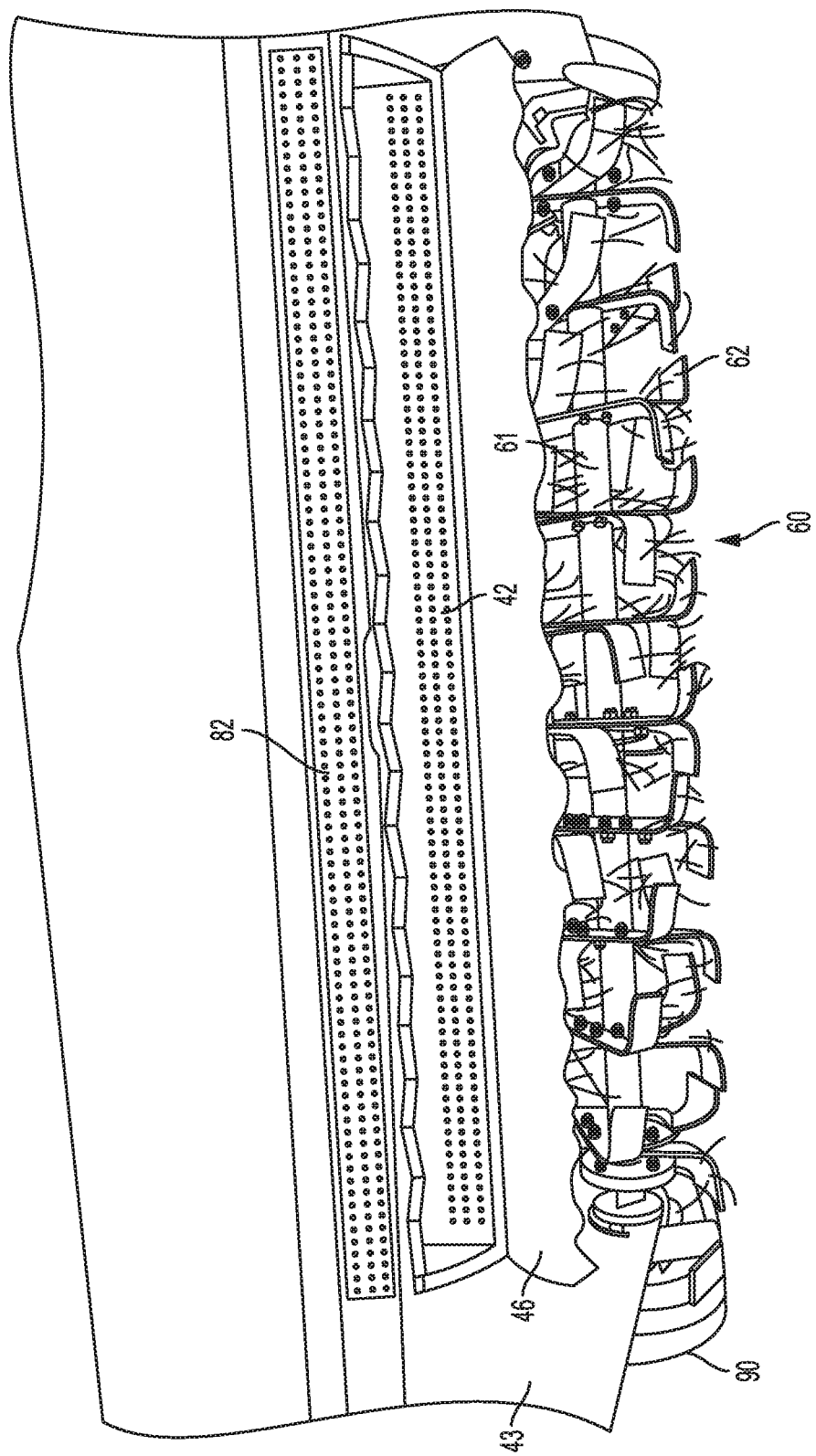
FIG. 19 is a lower rear view of an embodiment of the soil conditioning apparatus invention of the present application showing ambient vents introducing ambient air into the drying chamber.

FIG. 19 is a lower rear view of an embodiment of soil conditioning apparatus 10. In this view, soil mixer 60 is visible. In the embodiment of FIG. 19, soil mixer 60 has a shaft 61 with a series of tines 62 extending from it. As mixer 60 rotates, tines 62 throw the soil into the air at the exit of burner 42 in drying chamber 43. If the soil is not already broken up, tines 62 can break up the soil to throw it in the air. As the soil is thrown up through drying chamber 43, a high proportion of moisture is removed from the soil. Ambient vent 82 introduces ambient air from ambient blowers 80 after burners 42. The ambient air provides additional influence over the soil conditioning process. Returning to FIG. 16, mixer drive cover 63 encloses transmission elements which drive shaft 61 of mixer 60. Returning to FIG. 17, bearing cap 64 marks the opposite end of shaft 61 of mixer 60. In some embodiments of soil conditioner 10, mixer 60 is driven by a power-take-off shaft (PTO) of the vehicle towing soil conditioner 10.

Figure 20:
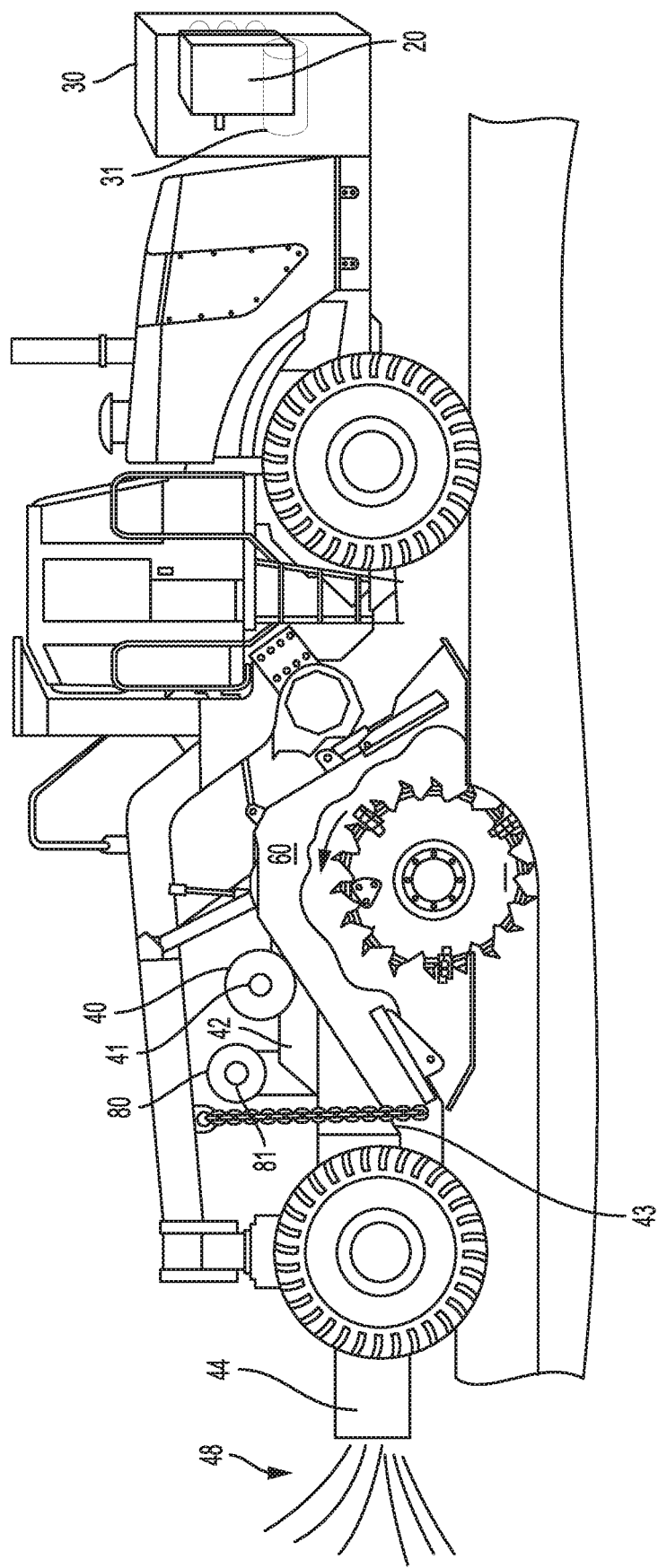
FIG. 20 is a side view of an embodiment of the soil conditioning apparatus invention of the present application having blowers directing ambient air into the drying chamber.
Figure 21:
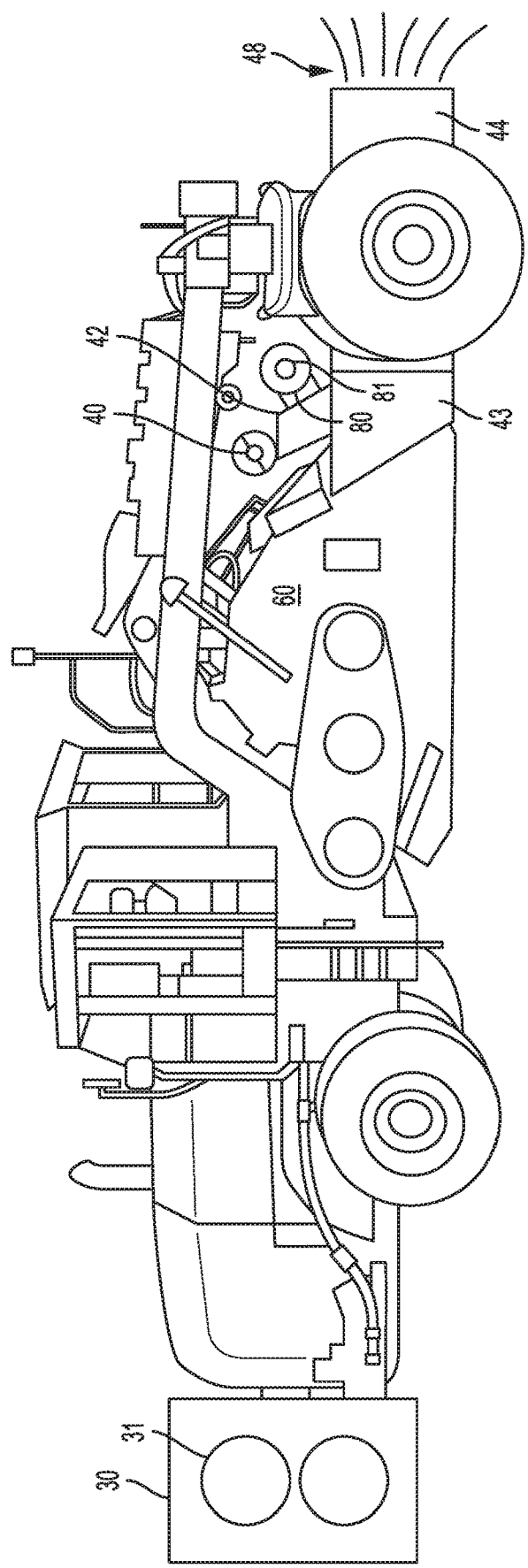
FIG. 21 is a side view of an embodiment of the soil conditioning apparatus invention of the present application having blowers directing ambient air into the drying chamber.

FIG. 20 is a side perspective view of an embodiment of the soil conditioning apparatus 10 of the present application. Cowling 44 further contains heated air close to the ground and extends between the rear wheels of a self-propelled vehicle. In this embodiment, a mobile ground soil conditioning apparatus with a structural frame is carried by a self-propelled vehicle. Ambient blowers 80 draw in ambient air at ambient intakes 81 and introduce the ambient air into the process behind burners 42. FIG. 21 is another side perspective view of an embodiment of the soil conditioning apparatus 10 of the present application. In FIG. 21, burners 42 direct heated air into drying chamber 43 while ambient blowers 80 direct ambient air into drying chamber 43.

While specific embodiments have been discussed for the sake of illustrating the current invention, particulars of the description of the embodiment should not be construed as limiting the invention. The apparatus may vary in many ways while still staying within the scope of this specification. For example, the fuel tanks could be moved to a trailer pulled behind a frame carrying the blowers, burner, mixer, and drying chamber. Moving the tanks to a separate trailer would distribute the weight and make the frame carrying the working elements of the soil conditioner lighter. It would also make the fuel source portion of the apparatus interchangeable which is helpful for apparatuses working in the field. Further, the apparatus and method could be adapted to soil stabilizers such as those made by Caterpillar, for example CAT SS-250, CAT RM-500 or built upon a self propelled chassis to create a vehicle dedicated to soil conditioning. Those well versed in the art can see the wide range of applications for such an apparatus with its high degree of adaptability. The independent adjustment of the air blowers, the burner, the rate of soil mixing, and the rate of conveying the apparatus, allows a wide variation of embodiments and operations for the apparatus and methods.

I claim:

1. A ground soil conditioning apparatus, comprising:
    a first blower for inducing a first flow of non-recirculating air;
    a burner for heating the first flow of non-recirculating air;
    electrical controls for the burner;
    a mixer for mixing ground soil at the surface of the ground;
    a duct for directing the heated first flow of non-recirculating air onto the mixer;
    a drying chamber, the drying chamber receiving the first flow of non-recirculating air from the duct, and having an exit away from the duct, the drying chamber being open to the ground;
    a second blower for inducing a second flow of non-recirculating air, the second flow of non-recirculating air remaining ambient and being vented directly into the drying chamber; and,
    a wheel for moving the apparatus.

2. The ground soil conditioning apparatus of claim 1, wherein:
    the burner burns fuel in direct contact with the first flow of non-recirculating air.

3. The ground soil conditioning apparatus of claim 1, wherein:
    the electrical controls for the burner are powered by an onboard generator.

4. The ground soil conditioning apparatus of claim 3, wherein:
    the onboard generator is driven by an internal combustion engine.

5. The ground soil conditioning apparatus of claim 1, wherein:
    the mixer is driven by a power take-off.

6. The ground soil conditioning apparatus of claim 1, further comprising:
    a trailer frame having a hitch for attaching to a towing vehicle, the wheel, the first blower, the burner, the electrical controls, the mixer, the duct, the drying chamber, and the second blower attaching to the trailer frame.

7. The ground soil conditioning apparatus of claim 1, further comprising:
    a structural frame upon which the first blower, the burner, the electrical controls, the mixer, the duct, the drying chamber, and the second blower are built, the structural frame fitting into, or upon a self-propelled vehicle.

8. The ground soil conditioning apparatus of claim 1, further comprising:
    a self-propelled vehicle upon which the first blower, the burner, the electrical controls, the mixer, the duct, the drying chamber, and the second blower are built.

9. A mobile ground soil conditioning apparatus comprising:
    a structural frame;
    a first reservoir of a first fuel mounted on the structural frame;
    a burner mounted on the structural frame and capable of receiving and burning the first fuel;
    electrical controls mounted on the structural frame, the electrical controls controlling the reception and burning of the first fuel by the burner;
    a generator mounted on the structural frame, the generator providing electricity to the electrical controls;
    a second reservoir of a second fuel mounted on the structural frame;
    an internal combustion engine mounted on the structural frame and receiving and consuming the second fuel, the internal combustion engine driving the generator;
    a first blower mounted on the structural frame, the first blower blowing non-recirculating air through the burner to heat the non-recirculating air, the blower being powered by the generator;
    a mixer for mixing ground soil with the non-recirculating air;
    a duct for directing the non-recirculating air blown through the burner onto the mixer;
    a drying chamber that receives the heated non-recirculating air from the duct, and directs the non-recirculating air to exit the apparatus;
    a second blower powered by the generator, the second blower being ducted to the drying chamber and directing ambient air directly into the drying chamber; and,
    at least one wheel attached to the structural frame and a hitch extending from the structural frame, the hitch being adapted to connect to a self-propelled vehicle propelled by its own internal combustion engine.

10. The ground soil conditioning apparatus of claim 9, wherein;
    the burner burns fuel in direct contact with the non-recirculating air.

11. The ground soil conditioning apparatus of claim 9, wherein;
    the mixer is driven by a power take-off.

12. A mobile ground soil conditioning apparatus comprising:
    a structural frame;
    a first reservoir of a first fuel mounted on the structural frame;
    a burner mounted on the structural frame and capable of receiving and burning the first fuel;
    electrical controls mounted on the structural frame, the electrical controls controlling the reception and burning of the first fuel by the burner;
    a generator mounted on the structural frame, the generator providing electricity to the electrical controls;
    a second reservoir of a second fuel mounted on the structural frame;
    an internal combustion engine mounted on the structural frame and receiving and consuming the second fuel, the internal combustion engine driving the generator;
    a first blower mounted on the structural frame, the first blower blowing non-recirculating air through the burner to heat the non-recirculating air, the first blower being powered by the generator;

a mixer for mixing soil of a ground surface with the non-recirculating air;

a duct for directing the non-recirculating air blown through the burner onto the mixer;

a drying chamber receiving the heated non-recirculating air from the duct and directing the non-recirculating air to exit the rear of the apparatus;

a second blower powered by the generator, the second blower being ducted to the drying chamber and directing ambient air directly into the drying chamber; and, a self-propelled vehicle, the structural frame being carried by the self-propelled vehicle, the self-propelled vehicle being propelled by its own internal combustion engine.

13. The mobile ground soil conditioning apparatus of claim 12, wherein;

the burner burns fuel directly in the flow of the non-recirculating air.

14. The mobile ground soil conditioning apparatus of claim 12, wherein;

the mixer is driven by a power take-off.

\* \* \* \* \*